J. R. HILL.
HAY-RICKING APPARATUS.

No. 169,542.  Patented Nov. 2, 1875.

Witnesses
C. A. Johnson
Arthur Wright

Inventor,
John R. Hill,
by Thomas G. Orwig.
Atty.

UNITED STATES PATENT OFFICE.

JOHN R. HILL, OF BLOOMFIELD, IOWA.

IMPROVEMENT IN HAY-RICKING APPARATUS.

Specification forming part of Letters Patent No. 169,542, dated November 2, 1875; application filed June 7, 1875.

*To all whom it may concern:*

Be it known that I, JOHN R. HILL, of Bloomfield, in the county of Davis and State of Iowa, have invented a Hay-Ricking Apparatus, of which the following is a specification:

The object of my invention is to save time and labor in securing hay and other crops in the field by putting the same in ricks by machinery operated by horse-power. It consists in an adjustable and hinged platform, and a derrick, constructed and operated as hereinafter fully set forth.

Figure 1:
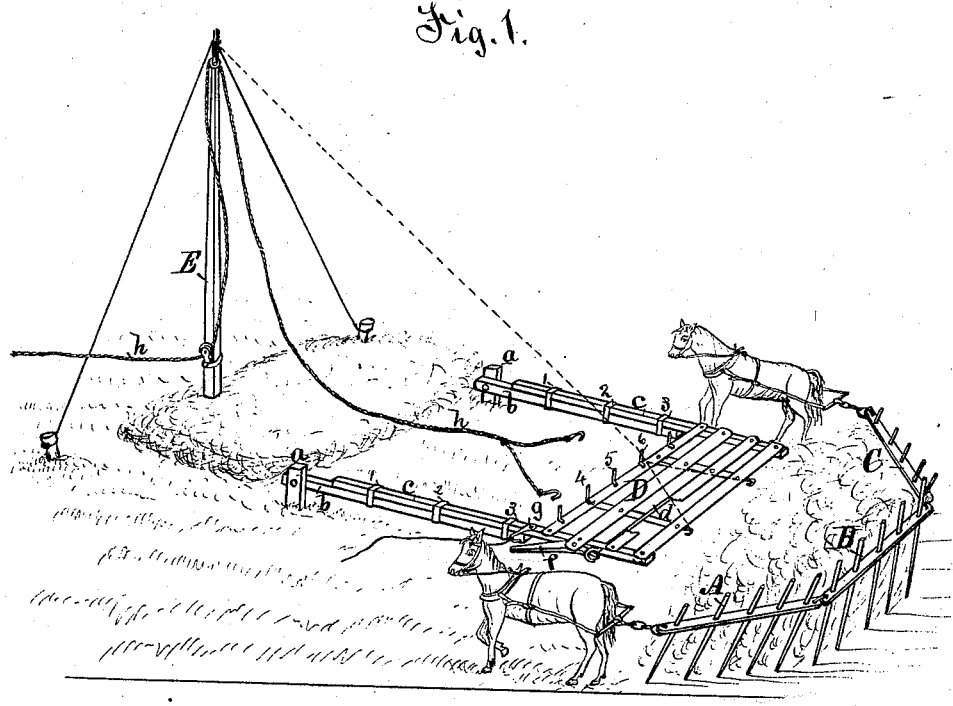
Figure 2:
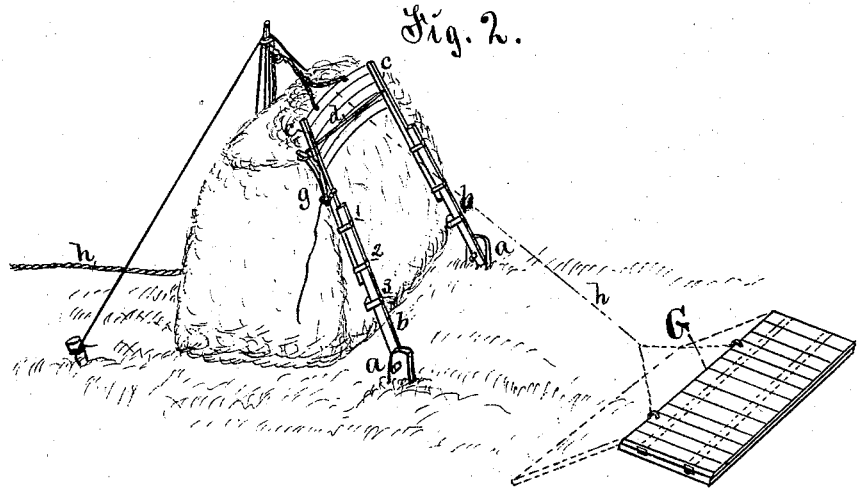

Figure 1 of my drawing is a perspective view, illustrating the construction of my rake and platform, and the manner of operating them. Fig. 2 is a perspective view, illustrating the manner of elevating the hay, and forming and roofing a rick by means of my apparatus.

A B C represent three sections of a rake hinged together to form a complete flexible rake, about twenty (20) feet long, adapted to stride a swath or windrow of hay. By hitching a horse at each end the windrow can be readily gathered and carried in the direction traveled by the horses, to be deposited on my hinged platform. $a\,a$ are stakes driven in the ground aside of the space designed for the rick or stack. $b\,b$ are posts hinged to the stakes in any suitable manner. $c\,c$ are bars, carrying loops 1 2 3, to slide on the posts $b$. D is a platform composed of a series of elastic bars rigidly attached to the bars $b$. $d$ is a stay-rod, having a hook or loop on one end, passed through one of the bars $b$ and rigidly secured to the other bar at the opposite side of the platform. $f$ is a bent lever pivoted to the platform D in such a manner that its short end will engage the loop on the end of the stay-rod $d$. $g$ is a hook, having a cord attached, pivoted to the bar $b$ in such a manner that it will engage the long end of the lever $f$. 4 5 6 represent a series of hooks or pins projecting from the lower edge of the platform D to prevent the hay from slipping off when the platform is raised into a vertical position. E represents a post or derrick sustained by guy-ropes. $h\,h$ is a rope running over suitable pulleys at the top and bottom of the derrick E, and has hooks on its forked end, designed to be attached to the top edge of the platform D when it is loaded.

Broken lines indicate the manner of connecting the rope with the platform to elevate the platform and its load.

Fig. 2 shows the platform D elevated and in position to deposit its load on the rick. G represents a roof composed of two hinged sections in position as required to be elevated.

When the rick is ready for the roof, the platform D can be moved from the hinged posts $b$, and the posts $b$ then used as skids, over which the roof G can be drawn by the rope $h$, to slide to the top of the stack or rick, where the sections can be spread and adjusted as required, to form a complete roof to protect the hay.

In the practical operation of my apparatus, the hay is brought upon the platform D by the horses passing along the outside of the platform D and dragging the rake A B C and its load upon the platform. The horses are then wheeled about to move away from the platform, and to withdraw the rake from its load deposited upon the platform. The long end of the lever $f$ is then pressed in to engage the hook $g$ and draw upon the rod $d$, and thereby spring the flexible platform D upward in its center. The rope $h$ is then attached to the platform, and a horse hitched at its free end to draw upon the rope and elevate the platform and its load, as represented in Fig. 2.

By pulling on the cord attached to the hook $g$ the lever $f$ is freed, and the bent bars of the platform D will spring back to their normal position, and thereby disengage and drop the load.

The platform D, carried by the bars $c$ sliding on the hinged posts $b$, can be readily adjusted relative to the stakes $a$, as required by the gradual elevation of the stack or rick.

My hinged flexible rake may be formed of two or more sections, and vary in size as desired.

The length of the posts $b$, bars $c$, and the size of the platform D may also vary to suit the size of the ricks and stacks desired.

I claim as my invention—

1. The platform D, carried by the bars $c$ and hinged posts $b$, substantially as and for the purposes shown and described.

2. The combination of the derrick E, having rope $h$ and the adjustable swinging platform D, substantially as and for the purposes shown and described.

JOHN R. HILL.

Witnesses:
A. H. HILL,
WILLIAM VOTAW.